United States Patent [19]

Ulrich et al.

[11] Patent Number: 4,468,090
[45] Date of Patent: Aug. 28, 1984

[54] FIBRE OPTICAL ARRANGEMENT FOR THE TRANSMISSION, IN A MANNER PRESERVING ITS POLARIZATION, OF LIGHT OF A DEFINED, LINEAR POLARIZATION STATE

[76] Inventors: Reinhard Ulrich, Alte Rennbahn 2, 2110 Buchholz, Fed. Rep. of Germany; Scott Rashleigh, 2651 Arlington Dr. Nr. 301, Alexandria, Va. 22306

[21] Appl. No.: 284,791

[22] Filed: Jul. 20, 1981

[30] Foreign Application Priority Data

Jul. 19, 1980 [DE] Fed. Rep. of Germany ....... 3027476

[51] Int. Cl.³ .............................................. G02B 5/172
[52] U.S. Cl. ................................... 350/96.30; 356/351
[58] Field of Search ............... 350/96.29, 96.30, 96.15, 350/96.14, 96.13, 370, 371; 356/35 D, 351

[56] References Cited

U.S. PATENT DOCUMENTS

| | | | |
|---|---|---|---|
| 3,625,589 | 12/1971 | Snitzer | 350/96.29 |
| 4,179,189 | 12/1979 | Kaminow et al. | 350/96.30 X |
| 4,274,854 | 6/1981 | Pleibel et al. | 350/96.30 X |
| 4,354,736 | 10/1982 | Maklad et al. | 350/96.30 X |
| 4,389,090 | 6/1983 | LeFevre | 350/96.29 |

FOREIGN PATENT DOCUMENTS

2855337 7/1980 Fed. Rep. of Germany ... 350/96.30

OTHER PUBLICATIONS

Ramaswamy et al., "Polarization Characteristics of Noncircular Core Single-Mode Fibers," *Appl. Optics*, vol. 17, No. 18, Sep. 1978, pp. 3014–3017.
Schneider et al., "Low-Birefringence Single-Mode Optical Fibers . . . ", *Appl. Optics*, vol. 17, No. 19, Oct. 1978, pp. 3035–3037.
Giallorenzi, "Fibre Optic Sensors," *Optics and Laser Technology*, vol. 13, No. 2, Apr. 1981, pp. 73–78.

*Primary Examiner*—John D. Lee
*Attorney, Agent, or Firm*—Antonelli, Terry & Wands

[57] ABSTRACT

A fiber optical arrangement for the transmission, in a manner preserving its polarization, of light of a linear polarization state using an optical fiber having a linear birefringence of an amount sufficient to provide extensive decoupling of the polarization-degenerate modes of oscillation of the light that can propagate within the fiber. The amount of linear birefringence $\beta$ required for decoupling these modes of oscillation is achieved by winding the optical fiber in an elastically extended condition upon a winding form and fixing it thereon in this elastically extended state, the linear birefringence $\beta = \beta_{tc} + \beta_b$ being preferably three times greater than the intrinsic birefringence $\beta_i$ of the optical fiber. The fiber optical arrangement may be used within an interferometer for measuring pressures or, if mounted to rotate, within a Sagnac interferometer also for the exact measurement of rotations and rates of angular displacements.

5 Claims, 3 Drawing Figures

FIBRE OPTICAL ARRANGEMENT FOR THE TRANSMISSION, IN A MANNER PRESERVING ITS POLARIZATION, OF LIGHT OF A DEFINED, LINEAR POLARIZATION STATE

The present invention relates to a fiber optical arrangement for the transmission, in a manner preserving its polarization, of light of a defined—linear—polarization state using a fiber optical waveguide having a linear birefringence of an amount sufficient to provide extensive decoupling of the polarization-degenerate modes of oscillation of the light that can propagate within the fiber.

Fiber optical arrangements for supervising or measuring physical parameters, such as pressures, temperatures, or phase velocities, or the like, often use the principle of the interferometric determination of optical path lengths or changes thereof which are influenced in a characteristic manner by the parameters to be supervised and/or to be determined. For the purpose of marking the optical signal paths, these arrangements usually employ optical monomode fibers in which light can propagate in one single mode, but two intrinsic polarization states orthogonal relative to each other. Corresponding to this characteristic of monomode fibers it is necessary that the light waves that are to be brought to interfere and that propagate along light paths marked by different fibers or along two light paths marked by one single fiber, can be brought to interference in the same, for instance linear polarization state so that the variations of the intensity of the interference phenomena determined by suitable detectors can be associated with unmistakable variations of the values to be supervised and/or to be measured.

The modes of oscillation that can propagate in monomode fibres are the two orthogonal polarization states of the linear-polarized $HE_{11}$ mode. In ideal, circular optical fibers which are free from birefringence the intrinsic oscillation modes are degenerate and exhibit the same phase velocity. In contrast, real fibers, even though their nominal cross-section may be circular, exhibit variations between the actual fiber cross-section and the ideal circular shape caused by production inaccurancies, tensions in the fiber material, microdistortions, etc., and as a result thereof an intrinsic birefringence $\beta_i$ resulting in the lifting of the said degeneration and coupling of the two intrinsic modes of oscillation which in turn heavily influences the state of polarization of the light in the fiber. As these disturbances are a function of the temperature, the state of polarization of the light waves to be brought to interfere is subjected to constant variations which, regarded separately, would considerably affect the sensitivity and measuring accuracy of all such arrangements.

In order to eliminate the difficulties resulting from the said instabilities of the state of polarization, one has developed polarization-preserving fibers exhibiting a defined, high linear birefringence which outweighs by far (approx. by 2 orders or magnitude) the relatively small variations of the birefringence caused by the said distrubances. In such fibers, coupling of the two intrinsic modes of oscillation is largely prevented, even in the presence of the said disturbances, so that the state of polarization of light waves propagating in the intrinsic modes of oscillation in the fiber is maintained.

The known optical fibers serving this purpose, which have been described in detail by the scientific literature, may be subdivided into two groups:

1. Fibers of circular core cross-section and forced elliptical cross-section of the fiber cladding, the increased linear birefringence $\beta$ of the fibers being obtained by elasto-optical effects between the fiber cladding and the fiber core. A typical value of the beat length $L_p$ which is characteristic of the birefringence behaviour of such fibers and which is defined by the equation $$L_p = 2\pi/\beta, \quad (1)$$

wherein, $$\beta = k_+ - k_-, \quad (2)$$

is the linear birefringence of the fiber and $k_-$ and $k_{30}$ are the propagation constants of the mode of oscillation having the higher and the lower phase velocity, respectively, is approx. 2 cm. For further details of this type of polarization-preserving optical fibres, reference is made to the relevant scientific literature (I. P. Kaminow, J. R. Simpson, H. M. Presby and J. B. MacChesney, "Strain Birefringence in Single Polarization Germanosilicate Optical Fibers", Electr.Lett., 15, 677 (1979) and R. H. Stolen, V. Ramaswamy, P. Kaiser and W. Pleibel, "Linear Polarization in Birefringent Single Mode Fibers", Appl. Phys. Lett., 33, 699 (1978)).

2. Fibers of elliptical core cross-section and a great difference of the refractive index between the core and the cladding (cf., for instance, R. B. Dyott, J. R. Cozens and D. G. Morris, "Preservation of Polarization in Optical Fiber Waveguides with Elliptical Cores", Elect. Lett. 15, 380 (1979)).

Optical fibers of this type show a very great linear birefringence with characteristic beat lengths $L_p$ of approx. 1 mm.

Both the fibers of the first-mentioned and of the latter type seem basically suited for application in fiber optical sensors because of their increased linear birefringence and the fact that as a result thereof decoupling of the polarization-degenerate modes of oscillation that can propagate in the said fibers can be achieved. However, to permit these fibers to bring their polarization-preserving effect into action, the state of polarization of the light coupled in must in any case correspond to the intrinsic polarization state characteristic of the fiber. Assuming linear polarization of the light, this means that the sense of polarization must for instance coincide with the direction of the "fast" axis of the fiber at any point thereof. In the case of a straight fiber, this means that the fiber should not be twisted, and when for sensitivity reasons the greatest possible fiber length is to be accommodated and, to save space, arranged in the form of a tightly wound coil, this means that the axes of refraction of the fiber must extend in parallel or radially to the bending axis of its turns and that the sense of polarization of the light is parallel or vertical to the bending axis. In practice, such an arrangement cannot be realized with long fibers of the two before-mentioned types, at least not in a simple manner. Moreover, the cladding of the fibers is generally enclosed by a jacket of circular or approximately circular outer cross-section which renders it still more difficult to arrange the fibers in a manner to receive the abovedescribed orientation of its axes of refraction. And in addition, the fibers of the second type—having a high difference between the refractive indices of the core and the cladding—offer the disadvantage of high transmission losses, a fact which makes them unsuited for a great number of possible applications in fiber optical sensors.

BRIEF DESCRIPTION OF THE INVENTION

Now, it is the object of the present invention to provide an arrangement of the type described above which ensures in a simple manner the orientation of the axes of refraction of the fibers required for a polarization-preserving propogation of the light in the fiber, and this even in cases where fibers of great length are employed.

According to the invention, this object is achieved in that the amount of linear birefringence $\beta$ necessary for decoupling these polarization-degenerate modes of oscillation is achieved by winding the optical fiber in an elastically extended condition upon a winding form and fixing it thereon in this elastically extended state.

This arrangement of the invention offers at least the following advantages:

The mechanical tensions induced in the fiber by its axial initial tension and the close winding around the winding form have a sense such that the principal axes of the induced birefringence behaviour of the fiber orient themselves automatically along a sense parallel or radial to the winding axis. Accordingly, the polarization-preserving arrangement of the invention is extremely easy to realize. Moreover, it is a particular advantage that it is also possible to employ usual fiber optical waveguides of circular cross-section of the core, cladding and jacket, which can be produced much easier and, as a result thereof, at much lower cost than the beforementioned fibers of elliptical core and/or jacket cross-section.

In a specific embodiment of the invention, the amount of the linear birefringence $\beta = \beta t_c + \beta_b$ achieved by the elastic extension and the spiral winding of the optical fiber is at least three times greater than the intrinsic birefringence $\beta_i$ of the optical fiber.

If this simple rule for sizing the birefringence that can be achieved by the elastic initial tension and bending of the fiber is observed, the polarization-preserving property of the arrangement of the invention is sufficiently guaranteed.

If the surface enclosed by the individual turns of the fiber is to be as big as possible, while on the other hand it must be possible to give the fiber small local curvature radii so as to derive from the elastic initial tension and bending of the fibre a sufficiently great linear birefringence amount $\beta$, it is of advantage if the individual turns of the optical fiber, which have their winding plane extend vertically in relation to the winding axis, are laid and retained upon a winding form in undulated shape.

For pressure and/or sound measurements, a fiber optical arrangement of the invention with preferably small diameter 2R is conveniently provided in at least one arm of a fiber optical interferometer and exposed to the pressure and/or sound to be measured.

Measurements or rates of rotation are conveniently effected using a fiber optical arrangement of the invention which is seated to rotate and which, in cooperation with a Sagnac interferometer, marks the light path closed through its main beam splitting and recombination unit, respectively.

BRIEF DESCRIPTION OF THE DRAWINGS

Further details and features of the invention will be apparent from the following description of certain embodiments and/or examples of the invention when read with reference to the drawings, in which.

DETAILED DESCRIPTION

Figure 1:
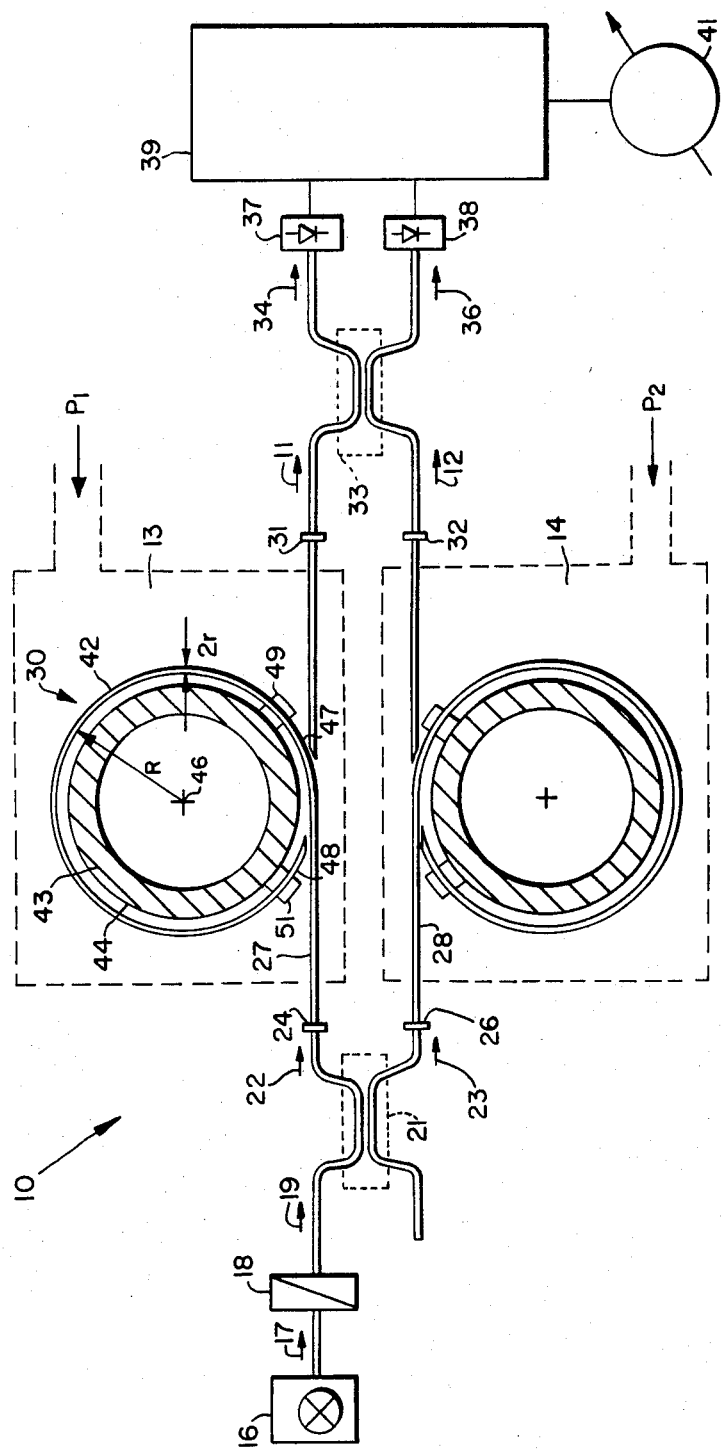
FIG. 1 shows a polarization-preserving fiber optical arrangement of the invention employed in a pressure and/or sound-measuring device.

Referring now expressly to the details of FIG. 1, the interferometric pressure-sensing device 10 shown in this figure permits to determine the differential pressure between the pressures $P_1$ and $P_2$ existing in the pressure chambers 13 and 14 from the interfering superposition of two coherent monochromatic partial light currents of equal polarization state which are represented in FIG. 1 by arrows 11 and 12.

A polarizer 18 separates from a monochromatic primary light flux—represented in FIG. 1 by arrow 17—emitted by a monochromatic light source 16, such as a laser diode, an initial light flux of a defined—for instance linear—polarization state—represented in FIG. 1 by arrow 19. This initial light flux 19 is split up in the beam splitter 21 which may for instance take the form of a waveguide coupler into two coherent partial light fluxes (arrows 22 and 23) of equal polarization state and substantially equal intensity. At the coupling points 24 and 26, the partial light fluxes 22 and 23, respectively, are coupled into light paths marked by optical fibers 27 and 28, the path lengths of the said light paths being of course pressure-dependent as the refractive indices of the optical fibers 27 and 28 exposed to the pressures $P_1$, $P_2$ are also a function of the existing pressures. The optical fibers 27 and 28 marking the light path in the pressure chambers 13 and 14 are part of a fiber optical arrangement 30 according to the invention which preserves the polarization state of the light fluxes 22 and 23 transmitted along the light paths marked by the optical fibers 27 and 28, respecively, and which will be described hereafter in further detail.

The partial light fluxes 11 and 12 which emerge at the coupling points 31 and 32 from the light paths marked by the optical fibers 27 and 28 of pressure-dependent optical path length and which, accordingly, exhibit the same polarization state as partial fluxes 22 and 23, are superimposed in a beam recombination unit 33 which, just as the beam splitter 21, may take the form of a waveguide coupler. The output light fluxes of the beam recombination unit 33 resulting from the interfering superposition of the partial light fluxes 11 and 12 and represented in the drawing by the arrows 34 and 36 are supplied to photoelectric detectors 37 and 38 whose intensity-proportional output signals are processed by means of an electronic evaluation unit 39 to form an electric output signal proportional to the differential pressure $(P_1 - P_2)$ and displayed in a convenient manner by display means 41.

The design of the fiber optical arrangements 30 according to the invention provided for transmitting, in a polarization-preserving manner, the light from the beam splitter 21 to the beam recombination unit 33 and serving to materialize the pressure-dependent light paths, will be described in detail hereafter with reference only to the arrangement comprising the optical fiber 27, i.e. the upper arrangement in FIG. 1.

For the purposes of the following description, assume, without thereby limiting the generality of the present invention, that the optical fiber 27 is a low-loss monomode fiber of circular cross-section and a diameter equal to 2r, the term circular having the generally accepted meaning. The optical fiber 27 is wound in an elastically extended state, the extension $\epsilon$ being approx. 0.3 to 1%, about a rigid coil form 43 to form a single-layer fiber coil 42. The coil form 43 has a circular cylindrical outer shell 44 shown in FIG 1, and the individual turns of the fiber coil 42 are arranged immediately adjacent each other and so that the area of each turn extends at a right angle to the central axis 46 of the coil form 43. The curvature or winding radius measured from the central axis 46 of the coil form 43 to the central fiber axis is indicated by R. In the area of the initial section 47, viewed in the direction of propagation of the light 22 or 11, following the coupling point 24, and in the area of the final section 48 of the winding 42 immediately before the coupling point 31, the optical fiber 27 is positively fixed, for instance by means of an epoxy resin adhesive, to suitable points 49 and 51 of the coil form 43. Between these two end-fixing points 49 and 51, additional fixing points may be distributed, if necessary, over the length of the winding to fix the extended optical fibre securely upon the coil form 43. The optical fiber 27 which is thus kept under axial tension is also pressed, by the effect of same tension, in radial direction against the shell 44 of the coil form 43.

Due to the transverse forces resulting from the curved disposition of the optical fiber 27 and the axial initial tension on the one hand and the curvature of the optical fiber 27 as separate factor on the other hand the optical fiber 27 has imparted to it a linear birefringence $\beta$ which has its principal axes extending in parallel and vertical to the axis of curvature 46 and the amount of which is defined by the equation:

$$\beta = \beta_{tc} + \beta_b, \quad (3)$$

wherein: $\beta_{tc}$ is defined by the formula:

$$\beta_{tc} = k(n^3/2)(P_{11} - P_{12})(1+\gamma)(2-3\gamma)(1-\gamma)^{-1} Kr\epsilon, \quad (4)$$

and represents that portion which results from the combined effect of the curvature of the fiber 27 and its axial extension $\epsilon$, while $\beta_b$ is defined by the formula:

$$\beta_b = k(n^3/4)(P_{11} - P_{12})(1+\gamma)K^2 r^2, \quad (5)$$

and represents that portion which results from the curvature $K = 1/R$ of the optical fiber 27 alone.

In the formulas (4) and (5), $k = 2\pi/\lambda$ is the vacuum-propagation constant, n is the value of the refractive index of the fiber material relevant for the $HE_{11}$ mode, $P_{11}$ and $P_{12}$ are the relevant components of the photoelastic tensor (cf. J. F. Nye "Physical Properties of Crystals", Clarendon Press, Oxford (1969)) and $\gamma$ is Poisson's ratio.

Based on the material constants of fused silica (n=1.46; $\gamma$=0.17 and $(p_{11}-p_{12})$= −0.15) and $\lambda$=0.633 $\mu$m, the following equations can be derived from the formulas (4) and (5), namely:

$$\beta_{tc} = -28 \times 10^7 Kr\epsilon \text{ degrees/m}; \quad (6)$$

$$\beta_b = -7.7 \times 10^7 K^2 r^2 \text{ degrees/m}, \quad (7)$$

wherein the negative signs indicate that the "fast" axes of both amounts and, thus, the corresponding axis of the total induced birefringence $\beta$ coincide with the curvature radius R.

Therefore, if light coupled into the fiber coil 42 is to retain its polarization state when passing the light path 27, its polarization must be either vertical or parallel to the winding axis 46, in accordance with the states of intrinsic polarization determined by the induced birefringence $\beta$ of the fiber 27.

It directly results from the formulas (6) and (7) that $\beta_{tc}$ exceeds the portion $\beta_b$ of the induced birefringence resulting from the curvature of the fiber alone already in the case of moderate extensions ($\lesssim$1%), winding diameters 2R in the centimeter range and the usually employed fiber diameters of 2r=approx. 100 $\mu$m.

The stabilization of the polarization state with suitable polarization, i.e. polarization vertical or parallel to the winding axis 46, of light coupled into the fiber 27 is improved as the birefringence $\beta$ induced in the fiber by increase in the tensile and bending forces, relative to the intrinsic birefringence $\beta_i$ of the fiber 27 caused by the disturbances mentioned before, so that the following relation applies:

$$\beta = \beta_{tc} + \beta_b >> \beta_i. \quad (8)$$

The relation between the beat length $L_p$ and the birefringence being that shown by formula (1), typical values of the said beat length $L_p$ for usual circular, low-loss, non-extended fibers of good quality are in the range of approx. 1 to 2 m. In a typical case of birefringence $\beta_{tc}$ caused by tension and bending forces the beat length $L_p$ is only approx. 6 cm for a fiber diameter of 2r=100 $\mu$m, a winding diameter of 2R=5 cm and an extension of $\epsilon$=1%.

This comparison shows that in the arrangement 30 of the invention the condition (8) is easily met so that excellent stabilization of the polarization can be achieved.

As appears from formula (6), the birefringence obtained under the action of the elastic initial tension and, thus, the polarization-preserving effect of the arrangement 30 improves as the winding diameters are reduced. Accordingly, the advantageous polarization-preserving effect of the arrangement 30 according to the invention is particularly remarkable when small winding diameters are used so that the arrangement 30 of the invention proves especially useful in cases where great importance must be placed on a space-saving design of a sensor arrangement, as for instance in the case of sound-sensing devices.

Figure 2:
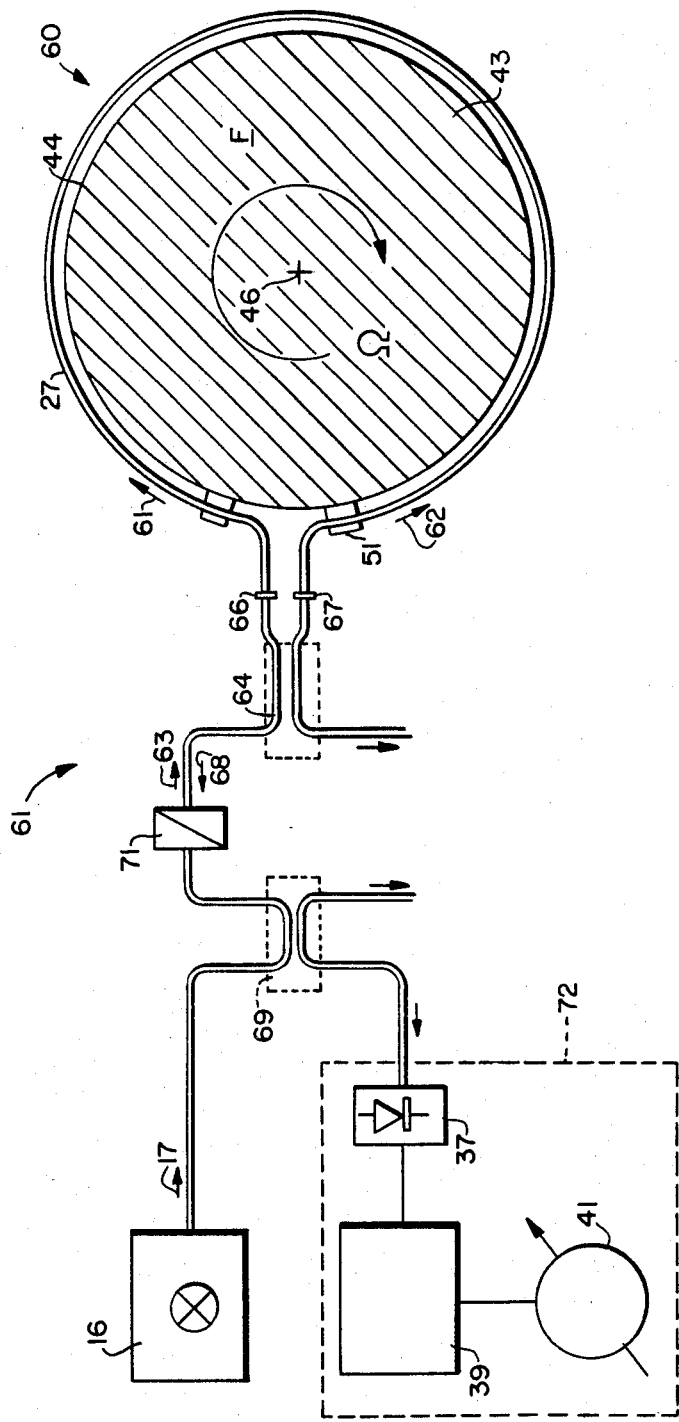
FIG. 2 shows an arrangement of the invention employed in a Sagnac interferometer suited for measuring rates of rotation.

Referring now expressly to the details of FIG. 2, the latter show another advantageous application of a polarization-preserving fiber optical arrangement 60 of a fundamental design absolutely analogous to that shown in FIG. 1, but employed in this instance in a Sagnac interferometer 61 suited for measuring small rates of angular displacement.

In this Sagnac interferometer 61, the optical fiber 27 defines the course of a light path encircling an area F. Partial light fluxes represented by the arrows 61 and 62 and produced by splitting up a primary light flux 63 by means of a main beam splitter 64 follow this light path in opposite directions. The partial light fluxes emerging from the fiber ends 66 and 67 in opposite directions are then superimposed in the main beam splitter 64 acting in this instance as beam recombination unit. The operation of the Sagnac interferometer arrangement described above is absolutely analogous to that of the interferometric pressure-sensing device 10 of FIG. 1.

When the fiber coil 60 rotates at an angular speed $\Omega$, a phase shift equal to $\phi = 8\pi\Omega F/\lambda c$ occurs between the partial light fluxes 61 and 62 arriving at the beam recombination unit 64. In this formula, c is the light velocity and $\lambda$ the wave length of the radiation passed through the fiber 27. The phase shift $\phi$ is determined by measuring the intensity variation of the light flux 68 emerging from the beam recombination unit 64 in a direction opposite to the primary light fluxes 63. It is assumed that the functional elements required for this purpose, such as an auxiliary beam splitter 69 and electronic detector and evaluation means connected to its output end are known to those skilled in the art.

For the convenient operation of the Sagnac interferometer 61 it is essential firstly that the primary light flux 63 has a defined state of polarization which is fixed by a polarizer 71, and secondly that the partial light fluxes emerging from the fiber ends 66 and 67 have the same state of polarization to permit them to pass the polarizer 71 towards the evaluation arrangement indicated generally as 72. Insofar, the problem of this application also consists in stabilizing the state of polarization of the respective partial light fluxes against disturbing influences acting upon the length of the fiber 27, and this problem is solved in an elegant manner by the arrangement 60 according to the invention. Unless specifically mentioned, the reference numbers used in FIG. 1 have been employed also for the corresponding elements in FIG. 2 performing an analogous function. The polarizer provided in the Sagnac interferometer 61 which acts to separate the light flux 63 of defined state of polarization from the primary light flux 17 emitted by the light source 16 must be set to ensure that the partial light flux 61 produced by the main beam splitter 64 by splitting up the light flux 63, and entering the fiber 27 at the coupling points 66 and 67 exhibit equal polarizations parallel or vertical to the winding axis 46 which propagate in a stable manner as the intrinsic polarization states of the curved and extended fibre.

Figure 3:
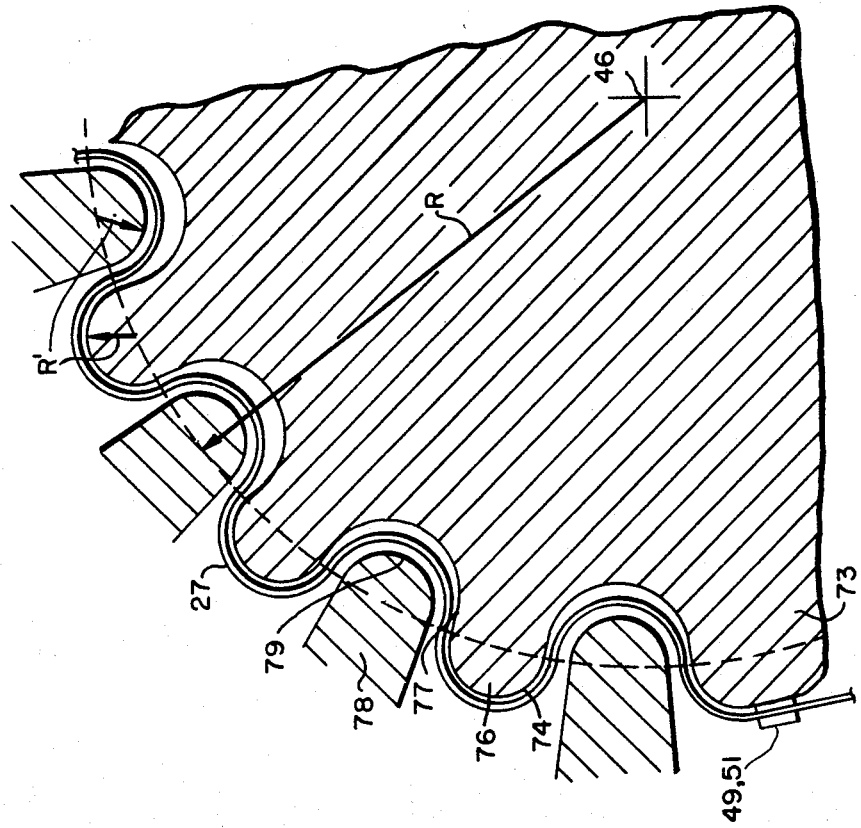
FIG. 3 shows a polarization-preserving fiber coil according to the invention for use in the arrangement shown in FIG. 2.

As in the case of rotary sensors of the type described with reference to FIG. 2 the sensitivity is a function of the area F encircled by the optical fiber 27, the winding diameter 2R necessarily cannot be as small as for instance in the case of the pressure sensing unit 10 shown in FIG. 1. Moreover, the extension $\epsilon$ of the fiber 27 cannot be increased beyond a value determined by its tensile strength. However, to achieve the high curvature values required by the formulas (4) and (5) to give a favorable high birefringence $\beta$, even in the case of an arrangement 60 with a big winding diameter 2R, the optical fiber may be given an undulated configuration as schematically shown in FIG. 3. In this case, the coil form 73, of which only one quadrant is shown in FIG. 3, has a shell 74 of undulated configuration, with alternating ribs 76 and grooves extending in the longitudinal direction, i.e. in parallel to the winding axis 46. The optical fiber 27 is again subjected to an elastic initial tension in the axial direction and fixed in a suitable manner to the coil form 73. To retain the fiber 27 in the undulated configuration shown in the drawing, which approximately corresponds to the outer contour of the coil form 73, supporting bodies 78 are provided in the area of the grooves 77. These supporting bodies 78 are adapted for being moved radially towards the coil form 73 and secured at a certain distance thereof. Their supporting faces 79 which bear against the optical fiber 27 are curved at a radius R' identical to that of the ribs 76 of a coil form 73. The amount of curvature determining the amount of the birefringence induced by the tension and bending forces acting in the optical fiber 27 is now mainly determined by the radius of curvature R' which is much smaller than the winding diameter 2R.

What we claim is:

1. A fiber optical arrangement for a transmission of light of a defined linear polarization state in such a manner so as to preserve a polarization of the light using a fiber optical waveguide having a linear birefringence of an amount sufficient to provide extensive decoupling of polarization-degenerate modes of oscillation of the light that can propagate within the fiber, characterized in that an amount of linear birefringence $\beta$ necessary for decoupling the polarization-degenerate modes of oscillation is achieved by a winding of an optical fiber in an elastically extended condition upon a winding form and fixing the optical fiber on the winding form in the elastically extended condition.

2. A fiber optical arrangement in accordance with claim 1, characterized in that the amount of linear birefringence $\beta = \beta_{tc} + \beta_b$ achieved by the elastic extension and a spiral winding of the optical fiber is at least three times greater than an intrinsic birefringence $\beta_i$ of the optical fiber, wherein:
   $\beta_{tc}$ = a portion of the birefringence resulting from a combined effect of a curvature of the optical fiber and axial extension thereof, and
   $\beta_b$ = a portion of the birefringence resulting only from the curvature of the optical fiber.

3. A fiber optical arrangement in accordance with one of claims 1 or 2, characterized in that individual turns of the optical fiber having a winding plane normal to a winding axis are laid and retained upon the winding form in an undulated shape.

4. A fiber optical arrangement for the polarization-preserving transmission of light in accordance with one of claims 1 or 2, characterized in that the arrangement is mounted for rotation and marks within a Sagnac interferometer a light path closed through a main beam splitter and a beam recombination unit, respectively.

5. A fiber optical arrangement for a polarization-preserving transmission of light in accordance with claim 1, for use in pressure-measuring applications, characterized in that an arrangement of preferably small winding diameters is provided in at least one arm of a fiber optical interferometer for exposure to a pressure to be measured.

* * * * *